United States Patent [19]

Stravitz

[11] Patent Number: 5,024,168
[45] Date of Patent: Jun. 18, 1991

[54] CAROUSEL STORAGE DEVICE WITH ROTATING OBJECTS ON TOP THEREOF

[76] Inventor: David M. Stravitz, 16 Park Ave., New York, N.Y. 10016

[21] Appl. No.: 532,011

[22] Filed: Jun. 1, 1990

[51] Int. Cl.$^5$ ............................................... A47B 57/00
[52] U.S. Cl. ........................................ 108/94; 108/20; 312/252
[58] Field of Search .................... 108/20, 94; 312/202, 312/248, 252

[56] References Cited

U.S. PATENT DOCUMENTS

| | | | |
|---|---|---|---|
| 275,209 | 4/1883 | Heineke | 108/20 |
| 729,642 | 6/1903 | Nash | 108/94 |
| 1,208,457 | 12/1916 | Bellville | 108/94 |
| 1,348,386 | 8/1920 | Wronowski | 108/20 |
| 3,341,266 | 9/1967 | Schecter | 312/252 |
| 3,850,487 | 11/1974 | Batchelor | 312/252 |

*Primary Examiner*—Kenneth J. Dorner
*Assistant Examiner*—Gerald A. Anderson
*Attorney, Agent, or Firm*—Frishauf, Holtz, Goodman & Woodward

[57] ABSTRACT

A multi-sided carousel storage device is rotatably mounted and has a plurality of storage cavities for receiving objects. Part of the rotatable mechanism comprises a stationary member having an upright member connected thereto, the upright member being fixedly connected to a platform member arranged in an opening of an upper surface of the carousel unit. The upper surface of the carousel unit includes a ring-like member having a bearing surface thereon. Rotatable members are mounted on the fixed platform and have bearing surfaces which bear against the bearing surface of the ring-like member, so that when the carousel member is rotated, the rotatable members rotate to frictional engagement with the bearing surface of the ring-like member. Decorative objects are preferably removably mounted on the rotatable members to rotate with rotation of the carousel device. Specific storage and shelf configurations are also disclosed.

23 Claims, 5 Drawing Sheets

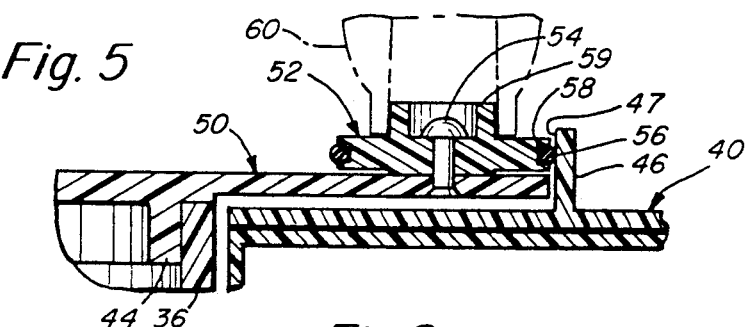
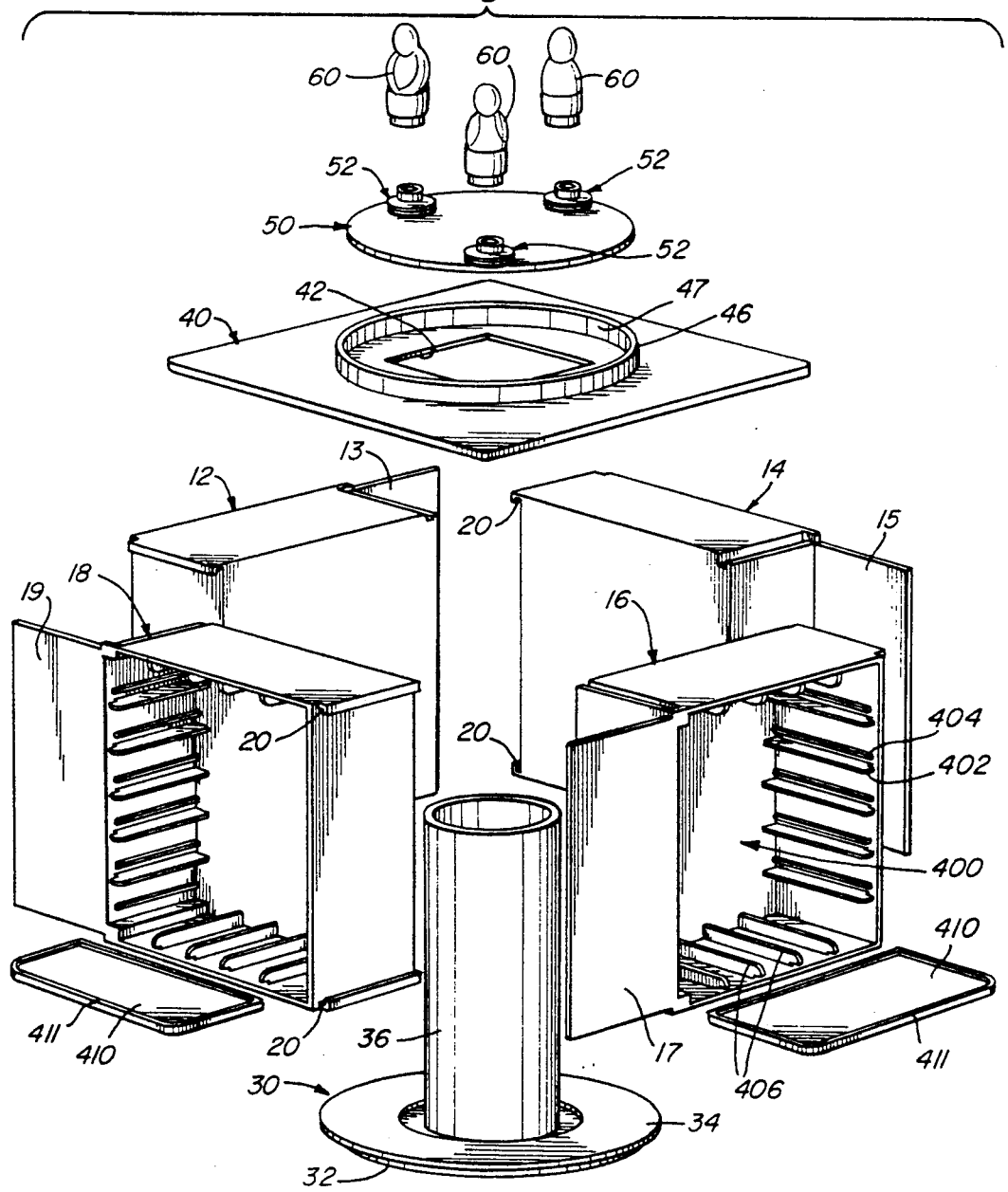

CAROUSEL STORAGE DEVICE WITH ROTATING OBJECTS ON TOP THEREOF

BACKGROUND OF THE INVENTION

This invention relates to carousel-type storage devices, and more particularly to carousel storage devices having very flexible storage capabilities, and having rotatable objects on the top thereof, the objects being rotatable upon rotation of the carousel.

Carousel storage devices are generally known in the art, for example for storing audio cassette tapes, video cassette tapes, books, food products, and the like.

An object of the present invention is to provide an improved carousel storage device having improved storage capabilities.

Another object of the invention is to provide an improved carousel storage device having rotatable objects on an upper surface thereof which rotate when the carousel is rotated.

SUMMARY OF THE INVENTION

According to an aspect of the present invention, a carousel storage device comprises a multi-sided storage arrangement having a plurality of storage cavities for receiving objects; rotation means coupled to one of (i) a lower portion of said multi-sided storage apparatus for permitting rotation of said storage apparatus, said rotation means including a stationary member adapted to be placed on a support surface, and a rotatable member coupled to said stationary member and rotatable relative to said stationary member, said rotatable member being coupled to said multi-sided storage arrangement for rotation therewith; an upstanding member coupled to said stationary member so as to be immovable relative to said stationary member; a platform secured to an upper portion of said upstanding member so as to be immovable relative to said upstanding member and relative to said stationary member; a ring member coupled to one of (i) an upper portion of said multi-sided storage apparatus so as to be movable with said multi-sided storage arrangement upon rotation of said multi-sided storage apparatus, and (ii) said platform member so as to be stationary upon rotation of said multi-sided storage apparatus, said ring member having a bearing surface; and at least one rotatable member rotatably coupled to the other of said platform member and said upper portion of said multi-sided storage apparatus, said at least one rotatable member including means for engaging said bearing surface of said ring member for imparting rotation to said at least one rotatable member relative to said platform member upon rotation of said ring member as a result of rotation of said multi-sided storage apparatus.

According to another aspect of the invention, unique storage capabilities and shelf configurations are provided, to improve storage capabilities and ease of use.

BRIEF DESCRIPTION OF THE DRAWINGS

FIG. 5 is an enlarged sectional detail taken along line 5—5 in FIG. 3;

FIG. 6 is an exploded view of the carousel storage device of the present invention showing the various parts in disassembled state;

DETAILED DESCRIPTION

Figure 1:
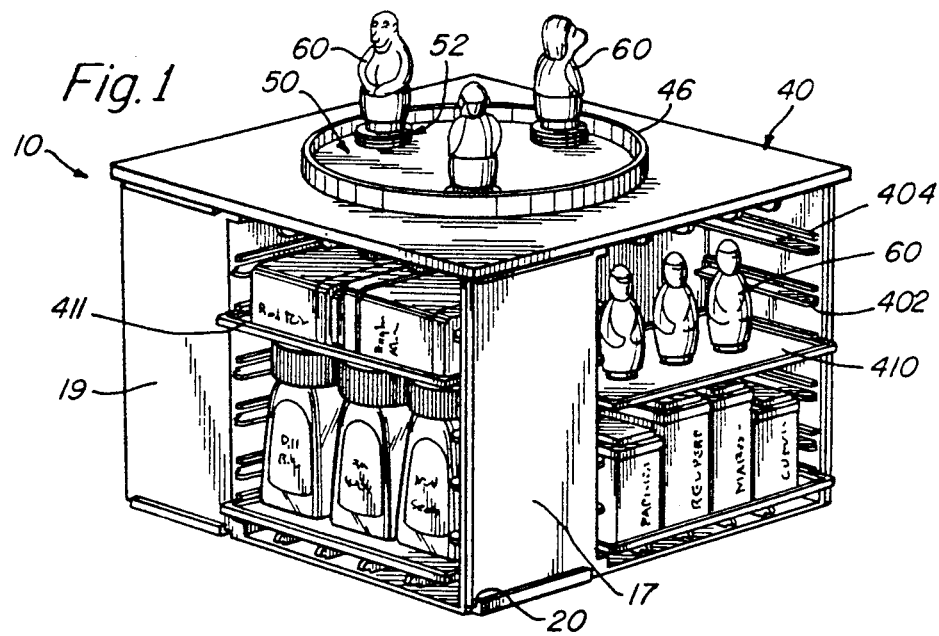
FIG. 1 is a perspective view showing a carousel storage device having rotatable figures on the top thereof, in accordance with the present invention.
Figure 2:
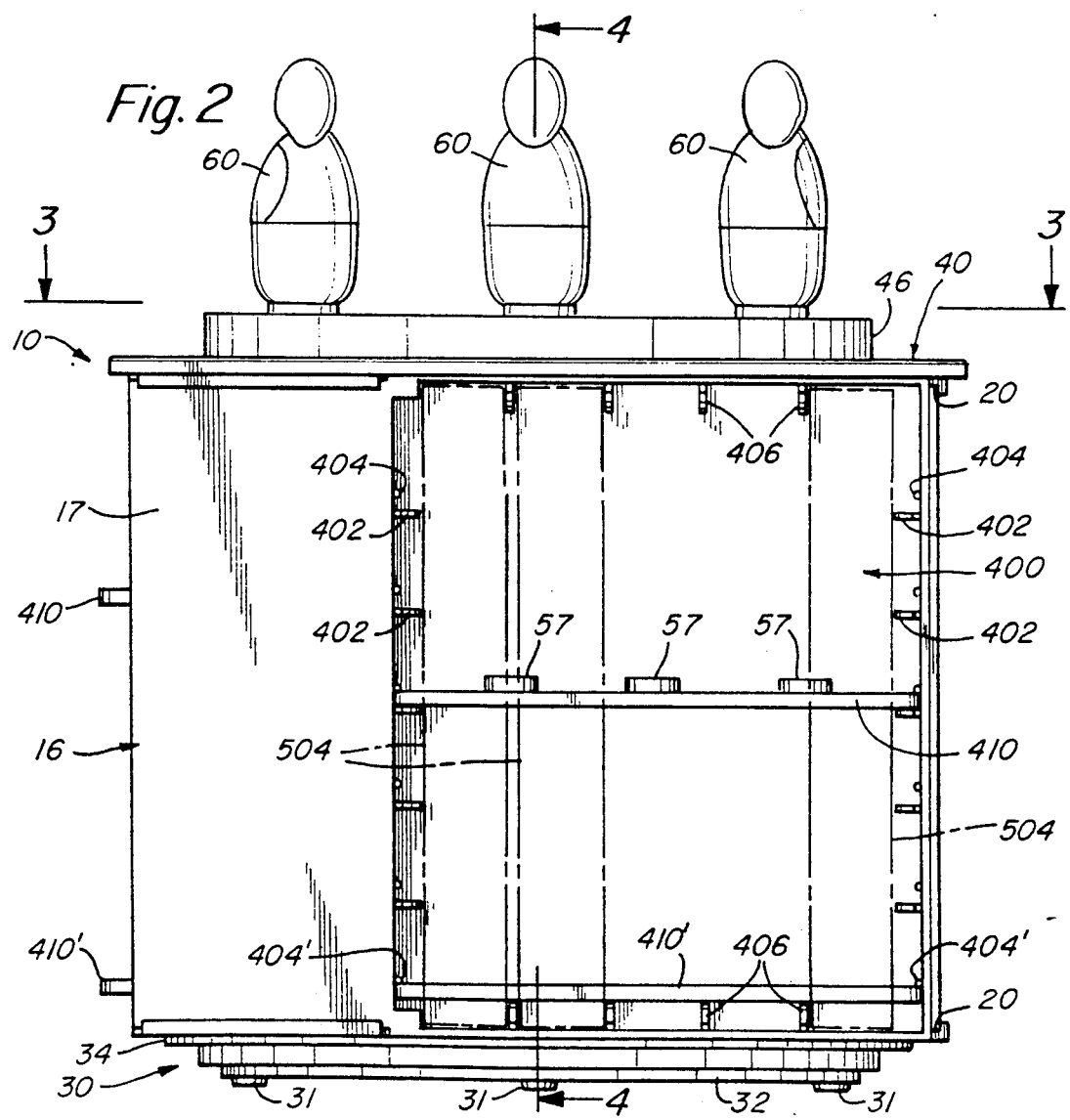
FIG. 2 is side view thereof.

As best seen in FIGS. 1, 2 and 6, the carousel storage device 10 of the present invention comprises four individual storage rack units 12, 14, 16, 18, each haVing at least one storage cavity, and a side flange 13, 15, 17, 19, respectively, extending therefrom. The respective side flanges are received in grooves 20 defined by respective opposite sides of the rack units 12, 14, 16, 18, and are preferably adhered to adjoining surfaces of the rack units 12, 14, 16, 18, so as to form a unitary rectangular carousel-like unit, as shown in FIG. 1. The side flanges 13, 15, 17, 19 are flat and the outer-facing surfaces thereof may be decorated to improve the appearance of the device. Since the side flanges are flat, they may be decorated by silk screening prior to assembly of the carousel device. A "lazy susan" device 30 has an upper member 34 which is adhered to or otherwise secured to (for example riveted) the lower surfaces of the rack units 12, 14, 16, 18. The lazy-susan 30 also has a lower member 32 which is adapted to rest on a support surface, such as a table or the like, on feet 31. The lower portion of upstanding member 36 is mounted over the ring 35 extending up from lower member 32, preferably by press fit, to improve structural integrity and to positively locate member 36 during assembly. These parts are also preferably adhered together. The upper member 34 is rotatable relative to the lower member 32, for example via ball bearings 33 (see FIG. 4) as is conventional in lazy-susan devices.

Figure 4:
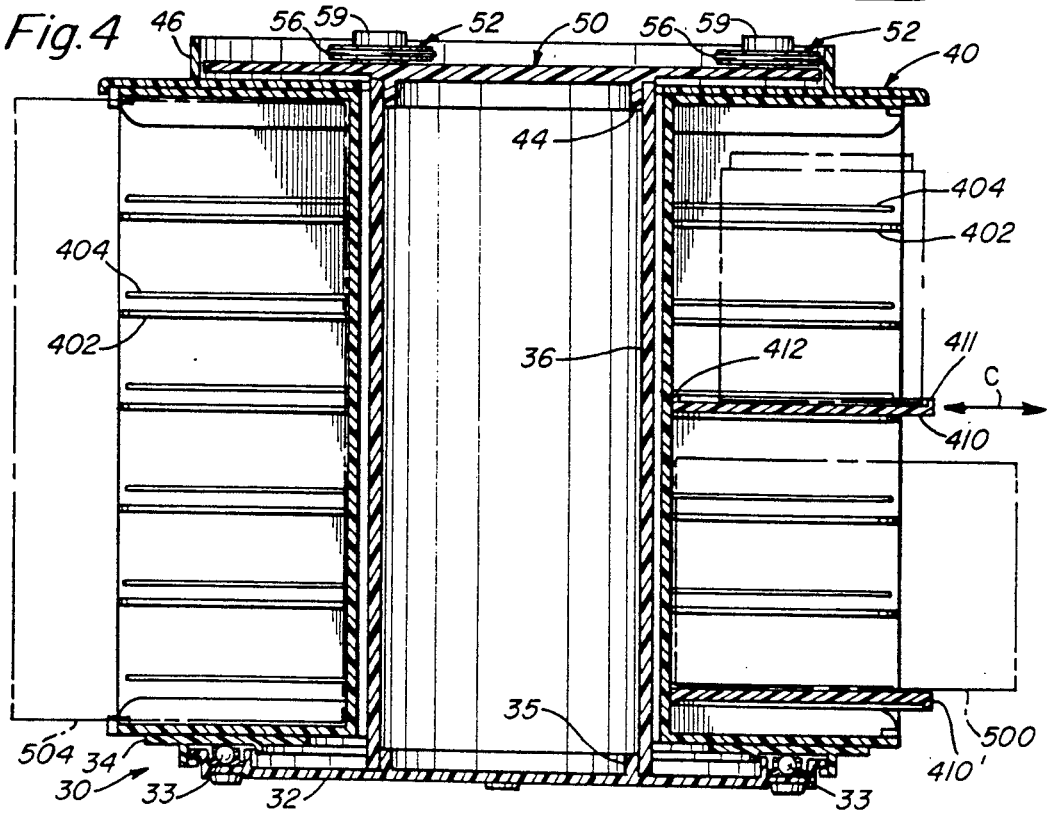
FIG. 4 is a sectional view taken along line 4—4 in FIG. 2.

An upstanding member 36 extends upwardly from the lower member 32 of the lazy-susan device 30, so as to be fixedly connected therewith via upstanding ring 35 (for example by means of adhesive or "plastic" welding). The upstanding member 36 is shown in the form of a tubular member, but it could take any shape, such as a box-shaped member, a rod, an X-shaped member or the like. The upper portion of upstanding member 36 extends through opening 42 in the upper surface member 40 of the carousel. The upper surface member 40 is connected to, for example by means of an adhesive, the upper surfaces of the storage rack units 12, 14, 16, 18, so as to be integral therewith. Further provided is a platform member 50 which is fixedly connected to the upper end of upstanding member 36, for example by means of a press-fit and/or adhesive, as shown in FIG. 4. A ring or shoulder 44 extends downwardly from said platform member 50, through the opening 42, and frictionally engages (press fit) within the hollow portion of the upper end of upstanding member 36, as clearly seen in FIG. 4. The upper end of member 36 may also be adhered to ring 44. Rings 35 and 44 not only improve structural integrity, but also serve as "locating devices" to facilitate accurate assembly.

Platform member 50 has thereon a plurality of round rotatable members 52 (three are shown in the drawings, but more or fewer may be provided) which are rotatably mounted to platform 50, for example, by means of a pivot pin 54, as shown in the detail of FIG. 5. Each of the rotating members 52 is constructed the same as is shown in FIG. 5, and each has a rubber or elastomeric O-ring 56 mounted in a groove 58 thereof, the O-ring 56 frictionally engaging the inner bearing surface 47 of upstanding ring member 46. Decorative objects or Figures 60 are mounted over the upper portion 59 of rotatable members 52, for example by a releasable press fit, as shown in FIG. 5. The decorative members 60 can be easily removed from or mounted on the rotatable members 52, as should be apparent. Decorative members 60 can be permanently affixed to rotatable members 52, but removable connection is preferred. The decorative members 60 (or extra objects 60) can be stored on a shelf unit having projections 57 thereon, as seen in FIGS. 1 and 2, and as will be discussed further below. Projections or bosses 57 on a shelf hold members 60 thereon in a same releasable press-fit manner as projections 59 on rotatable members 52. Decorative member 60 may simulate living beings such as people, animals, etc. or may represent inanimate articles, or be used for advertising purposes for commercial use.

Figure 7:
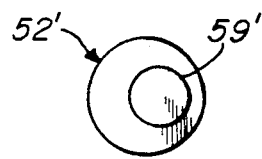
FIG. 7 illustrates a modified rotatable member having an eccentric mounting portion.
Figure 8:
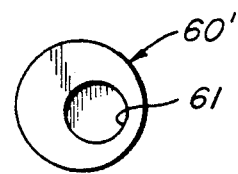
FIG. 8 is a bottom view of a modified decorative object having an eccentric opening in the bottom thereof for placement over a rotatable member of the carousel storage device.

As shown in FIG. 7, the rotatable members 52 can be modified as shown by 52' in FIG. 7, so as to have an eccentric mounting portion 59' extending upwardly therefrom, over which the decorative members 60 are preferably removably mounted. This eccentric arrangement of mounting portion 59' provides a more interesting movement of the decorative object 60 during rotation. A similar effect can be obtained by modifying the mounting portion of the decorative object 60' to provide an eccentric opening 61 (see FIG. 8) at the bottom portion thereof so as to fit over a centrally mounted mounting portion 59 of a rotatable member 50 or so as to fit over an eccentrically arranged mounting portion 59' of a rotatable member 52', so as to provide eccentric movement of the decorative object during rotation thereof.

Figure 3:
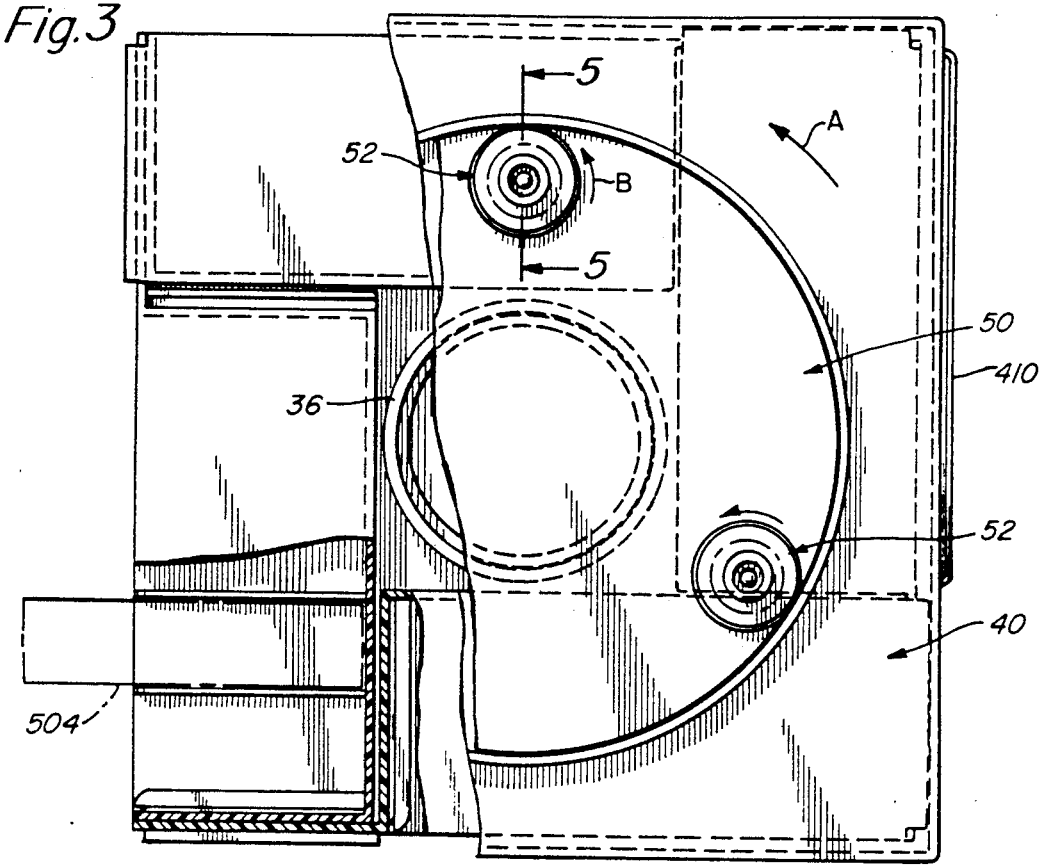
FIG. 3 is a sectional view taken along line 3—3 in FIG. 2.

In use, the carousel device of the present invention is placed on a table, or other flat surface, so that the lower member 32 of the lazy-susan device 30 rests thereon. As the carousel device is manually rotated, for example in the direction of arrow A in FIG. 3, the storage rack units 12, 14, 16, 18 and upper member 40 which is connected thereto, all rotate relative to the base portion 32 and upstanding member 36. Since platform 50 is fixedly connected to upstanding member 36, it remains stationary and does not rotate. Therefore, rotation of upper member 40 and of the upstanding ring 46 causes rotation of the rotatable members 52, by virtue of the frictional engagement between the O-rings 56 and the bearing surface 47 of upstanding ring 46, thereby causing rotation of the decorative objects 60, in the direction of arrow B in FIG. 3.

Figure 9:
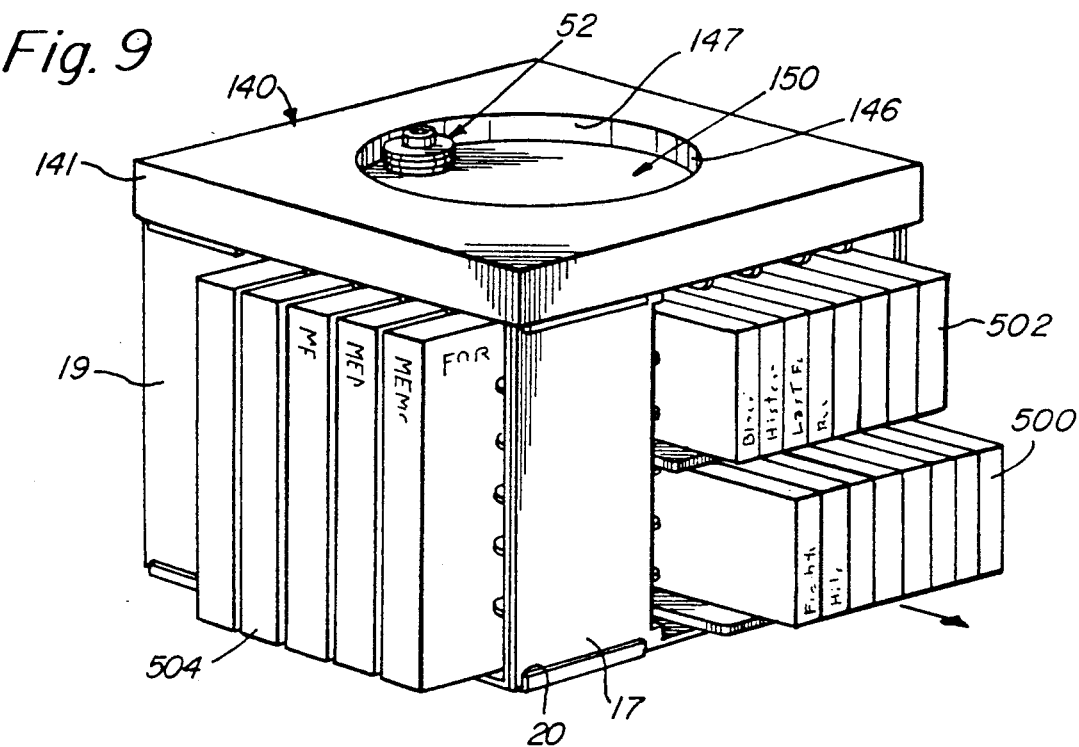
FIG. 9 is a perspective view showing a modification of the FIG. 1 embodiment and also showing the use of the carousel storage device of the present invention to store video and/or audio cassette tapes.

FIG. 9 shows a modified embodiment wherein the device is constructed the same as the FIG. 1 embodiment, except that the upstanding ring 46 of the FIG. 1 is replaced with a downwardly extending ring 146 in FIG. 9. This arrangement necessitates raising the upper surface of the upper member 140 and providing skirts 141 or the like around the side edges for a finished look. The platform 150 in FIG. 9 is substantially the same as the platform 50 in FIG. 1 and is connected to the lazy-susan member by means of an upstanding member 36 in the same manner as shown in FIGS. 4 and 6. The lazy-susan device is not seen in FIG. 9, but is provided in the same manner as in the previously discussed embodiment. The rotating members 52 in the embodiment of FIG. 9 (only one is shown for ease of illustration) are connected to the platform 150 in the same manner as in the previously described embodiment. The rotatable members 52 bear on a bearing surface 147 of downwardly extending ring 146 so as to cause rotation of the rotating members 52 upon rotation of the carousel device per se. The upper member 140 can be secured to the storage units 12, 14, 16, 18 by means of an adhesive or the like. Further discussion of this embodiment is deemed unnecessary in view of the previous discussion.

Figure 10:
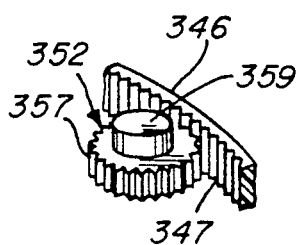
FIG. 10 shows a top view of a segment of a modification to raise ring 46 and rotatable member 52, having gears thereon.

FIG. 10 shows a top view of a segment of a modified raised ring 46 of the present invention wherein the modified raised ring 346 in FIG. 10 has gear teeth 347 on the inner surface thereof which mesh with gear teeth 357 formed on the outer surface of rotatable member 352. This provides a positive engagement of the members. The gear teeth may be of the desired depth, pitch, etc.. In all other respects, the ring 146 is similar to ring 46 of the first embodiment, and rotatable member 352 is similar to rotatable member 52 of the first embodiment. The gear teeth 347 and 357 can be formed during molding of the parts, since the parts of the present invention are preferably all molded from plastic material. The decorative objects are mounted on mounting portion 359, in the same manner as decorative objects are mounted on mounting portion 59 of FIG. 4.

Figure 11:
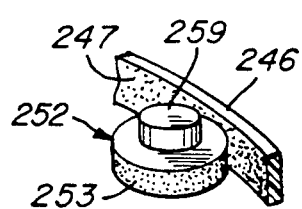
FIG. 11 shows another modification of raised ring 46 and rotatable member 52.

FIG. 11 shows another modified embodiment where the raised ring 246 is similar to raised ring 46, except that the inner surface 247 thereof is dimpled or roughened so as to provide better frictional engagement with the outer surface of rotatable member 252. The outer surface 253 of rotatable member 252 may also be roughened or dimpled, or it may be coated with rubber or other elastomeric material, or it may covered with a rubber or elastomeric belt to provide better frictional engagement with the roughened or dimpled inner surface 247 of ring 246. The decorative objects are mounted on mounting portion 259, in the same manner as decorative objects are mounted on mounting portion 59 of FIG. 4.

While FIGS. 10 and 11 illustrate modifications of the upstanding ring 46, similar modifications can be made to the downwardly extending ring 146 of FIG. 7 and to the ring 646 of FIG. 13 (to be discussed below).

The internal storage cavities of each of the storage rack units 12, 14, 16, 18 may be the same, or may be different, as desired, depending upon ultimate use of the carousel storage device. For ease of illustration, it will be assumed that the basic internal construction of each of the storage rack units 12, 14, 16, 18 is the same, and is as shown in FIG. 6. Description of only one storage rack device will be given, it being understood that the others are the same or similar. For purpose of discussion, the storage rack unit 16, shown in FIG. 2 in front view, will be described in detail.

Referring to FIGS. 2 and 6, the storage rack unit 16 has an internal hollow cavity 400 with a plurality of horizontally directed dividers or shelf supports 402, and a plurality of vertically directed dividers 406. As seen in FIG. 9, and as shown in dashed lines in FIG. 2, the vertical dividers 406 are arranged so that each cavity 400 may accept five VHS video tape cassettes 504 therein for storage, each being arranged vertically.

The horizontal supports or dividers 402 can be used to support shelves 410 which are slidable inward and outward of the cavity 400 in the direction of arrow C in FIG. 4, and which are mounted over horizontal supports 402, as is clearly seen in FIG. 2. Also provided are raised elongated ribs, projections or guides 404 spaced from and arranged above respective supports 402, and between which the shelves 410 slide, as seen in FIG. 2. The ribs or projections 404 improve the slidability of the shelves and also prevent tilting of the shelves when a force is applied on the forward or outward portion of the respective shelves, to thereby prevent spillage of any objects or materials stored on the respective shelves.

As seen from FIGS. 1 and 7, the shelves 410 preferably extend outwardly past the front surfaces of the storage rack units, so as to provide a larger support surface. The outwardly projecting portions of the shelves also provide gripping portions for a user to slide the shelf in and out, as desired, for easier access to objects stored on the shelves. As shown in FIG. 2, a lowermost pair of elongated projections 404' are provided at the bottom of each of the units 16 to secure a lowermost shelf 410' at the bottom of the device to provide a smooth lower surface for storage of objects. The shelf retaining ribs or projections 404 preferably extend over a major portion of the depth of the respective units 16, as clearly seen in FIGS. 1 and 4.

The shelves 410 preferably have a raised forward lip 411 which serves to present spillage of objects out of the unit due to centrifugal force when the carousel unit is rotated. Also, when the carousel unit is used to store audio tapes 500 or 8 mm video tapes 502, in FIGS. 9 and 12, for example, the raised forward lip 411 raises the outermost portions of the cassette tapes so that they tilt downwardly into the carousel unit. This creates inwardly directed forces, so that centrifugal forces generated when the carousel unit is rotated are prevented from spilling the tape cassettes outwardly of the storage unit. If the shelf unit has a raised inner edge 412 as shown in FIG. 4, the cassettes should preferably be stored so as not to rest on the raised inner edge 412 in order to provide the aforementioned downward sloping to prevent outward thrusting of the cassettes due to centrifugal force during rotation of the carousel device. The shelf units 410 may be provided with a lip 411 only on the outer portion, and without the lip 412 at the inner portion, to further improve storage of cassettes.

The lower shelf unit 410' in FIG. 4 is shown in its inverted state (with the raised lip 411 projecting downwardly). In this orientation, the improved effect of cassette retention is not provided, since the cassettes are stored horizontally, rather than with their outermost portions raised relative to their innermost portions. Preferably, for the storage of cassettes or other similarly shaped objects, the shelves are arranged with their front projecting lip 411 directed upwardly to help prevent spillage when the carousel is rotated.

Figure 12:
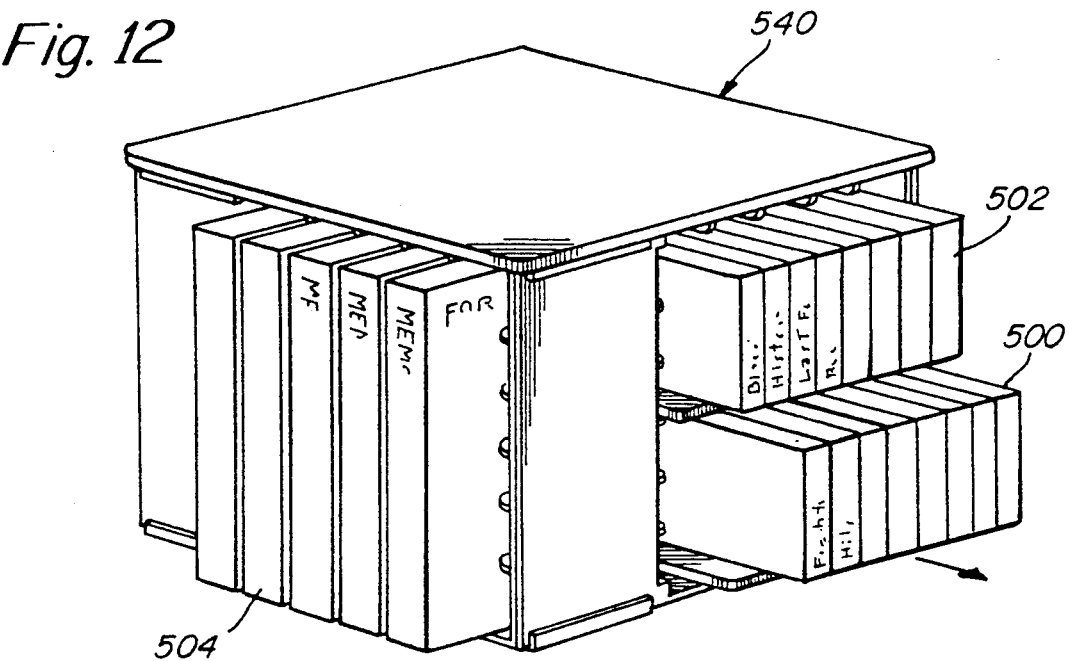
FIG. 12 is a perspective view of an embodiment of the carousel storage device of the present invention, similar to FIG. 7, but without the rotatable objects on the top thereof.

FIG. 12 illustrates an embodiment similar to that of FIG. 7, but without provision of the rotating members on the top portion thereof. Therefore, in this embodiment, the top 540 is flat and is adhered or connected to the upper surfaces of the storage rack units 12, 14, 16, 18 Also, since a rotating upper member is not provided, the upstanding member 36 is eliminated in this embodiment. A lazy susan-type device for rotation is provided at the lower surface of the unit of FIG. 12, in the same manner as in the previously described embodiments. In all other respects, the storage arrangement of the carousel device of FIG. 12 is the same as the previously described embodiments, and a further detailed discussion is deemed unnecessary.

Figure 13:
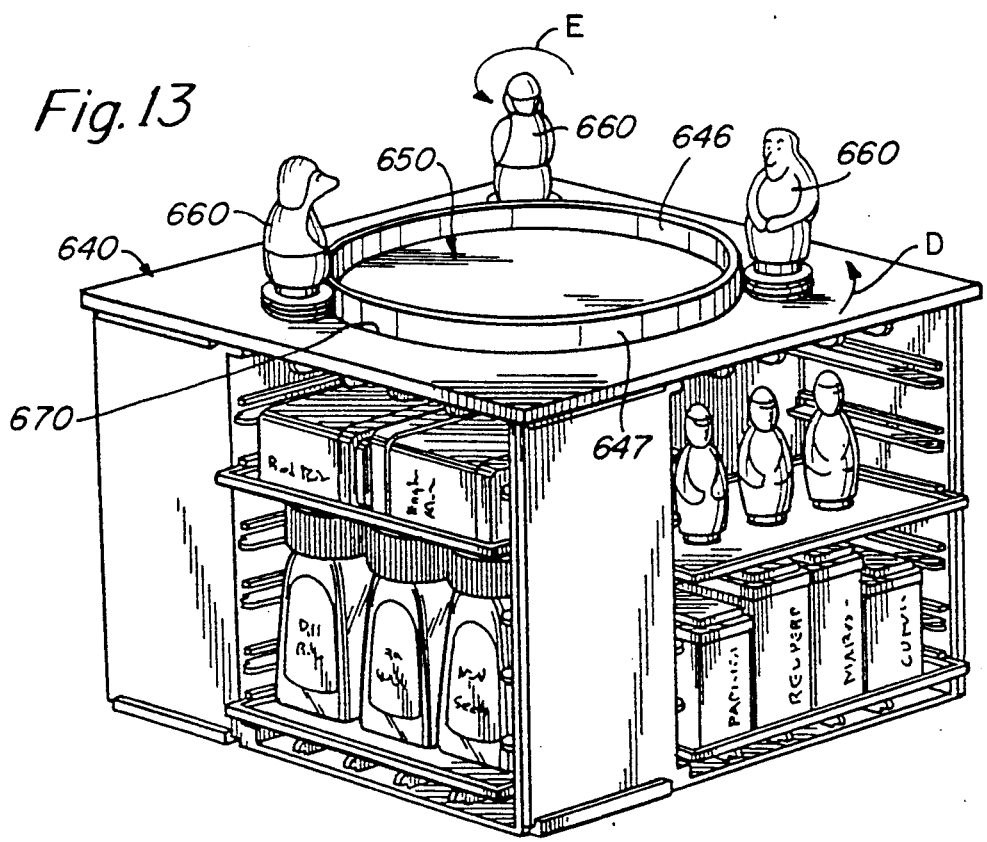
FIG. 13 shows another modified embodiment of the invention.

FIG. 13 illustrates yet another embodiment of the invention wherein the rotating member 660 are rotatably mounted on the upper surface 640 of the carousel unit, in a manner similar to that shown in FIG. 5 (for example, by means of a rivet 54 or other equivalent). In the embodiment of FIG. 1 the upstanding ring 46 was connected directly to the upper surface 40 of the carousel unit. In the embodiment of FIG. 13, however, the upstanding ring 646 is integrally connected with the fixed platform 650, for example by molding, and the outer surface of the upstanding ring 646 defines a bearing surface 64 which frictionally engages the O-ring 56 of a rotatable member so as to rotate the rotatable members in the direction of the arrow E when the carousel unit is rotated in the direction of the arrow D in FIG. 13. The platform 640 has an opening 670 therein which is greater in diameter than the outer diameter of the upstanding ring 646 so as to provide a small clearance therebetween to permit easy rotation.

In all other respect, the embodiment of FIG. 13 is identical to the previously described embodiments of FIG. 1.

While the invention as been described above with respect to specific embodiments, it should be clear that various modifications and alterations can be made within the scope of the appended claims.

What is claimed is:

1. A carousel storage device, comprising:
a multi-sided storage arrangement having a plurality of storage cavities for receiving objects;
rotation means coupled to a lower portion of said multi-sided storage apparatus for permitting rotation of said storage apparatus, said rotation means including a stationary member adapted to be placed on a support surface, and a rotatable member coupled to said stationary member and rotatable relative to said stationary member, said rotatable member being coupled to said multi-sided storage arrangement for rotation therewith;
an upstanding member coupled to said stationary member so as to be immovable relative to said stationary member;
a platform secured to an upper portion of said upstanding member so as to be immovable relative to said upstanding member and relative to said stationary member;
a ring member coupled to either an upper portion of said multi-sided storage apparatus so as to be movable with said multi-sided storage arrangement upon rotation of said multi-sided storage apparatus, or said platform member so as to be stationary upon rotation of said multi-sided storage apparatus, said ring member having a bearing surface; and at least one rotatable member rotatably coupled to the other of said platform member and said upper portion of said multi-sided storage apparatus, said at least one rotatable member including means for engaging said bearing surface of said ring member for imparting rotation to said at least one rotatable member relative to said platform member upon rotation of said ring member as a result of rotation of said multi-sided storage apparatus.

2. The apparatus of claim 1, further comprising at least one decorative member coupled to said at least one rotatable member for rotation therewith.

3. The apparatus of claim 2, comprising a plurality of rotatable members and a corresponding plurality of decorative members coupled to respective rotatable members.

4. The apparatus of claim 3, wherein said decorative members are removably coupled to said respective rotatable members.

5. The apparatus of claim 4, further comprising means in at least one of said storage cavities for removably receiving a decorative member thereon for storing of decorative members when said decorative members are not attached to said rotating members.

6. The apparatus of claim 2, wherein said at least one decorative member is removably coupled to said respective rotatable member.

7. The apparatus of claim 6, further comprising means in at least one of said storage cavities for removably receiving a decorative member thereon for storing of decorative members when said decorative members are not attached to said rotating members.

8. The apparatus of claim 1, wherein said ring member is coupled to said upper portion of said multi-sided storage apparatus, and wherein said at least one rotatable member is rotatably coupled to said platform member.

9. The apparatus of claim 8, wherein said ring member extends upwardly from said upper portion of said multi-sided storage apparatus.

10. The apparatus of claim 9, wherein said platform and said upper portion of said multi-sided storage apparatus are substantially coplanar.

11. The apparatus of claim 8, wherein said ring member extends downwardly from said upper portion of said multi-sided storage apparatus.

12. The apparatus of claim 11, wherein said upper portion of said multi-sided storage apparatus is at a higher horizontal level than said platform member.

13. The apparatus of claim 1, wherein said ring member is coupled to said platform member; and wherein said at least one rotatable member is coupled to said upper portion of said multi-sided storage apparatus.

14. The apparatus of claim 1, wherein said at least one rotatable member comprises elastomeric means at a peripheral surface portion thereof for frictionally engaging said bearing surface of said ring member.

15. The apparatus of claim 14, wherein said elastomeric means comprises an O-ring surrounding an outer peripheral surface of said at least one rotatable member.

16. The apparatus of claim 1, wherein said bearing surface of said ring member comprises gear means thereon, and wherein said at least one rotatable member has an outer peripheral surface with gear means thereon for engaging with said gear means of said ring member.

17. The apparatus of claim 1, wherein said multi-sided storage arrangement has at least one storage cavity having at least one shelf member and a plurality of horizontal shelf support members therein at different heights, for slidably receiving a shelf member thereon, and further comprising elongated rib means above each of said horizontal shelf support members and spaced from said horizontal shelf support members a predetermined distance which is greater than the thickness of a shelf member which is to be mounted on said shelf support members for engaging an upper surface portion of said shelf member, for thereby preventing tilting of said shelf member and improving sliding thereof.

18. The apparatus of claim 17, wherein said at least one shelf member projects outwardly from a front surface of said storage cavity.

19. The apparatus of claim 18, wherein said at least one shelf member has an upwardly projecting lip at an outward portion thereof for retaining articles on said shelf means, and for raising an outer portion of an article placed thereon for thereby imparting an inwardly directed force to said article supported thereon for preventing spillage of said article due to centrifugal force during rotation of said carousel storage device.

20. The apparatus of claim 1, further comprising:
at least one decorative member removably coupled to said at least one rotatable member for rotation therewith;
at least one shelf means slidably received in a storage cavity of said multi-storage arrangement; and
said at least one shelf means having means thereon for removably receiving said at least one decorative member for storing said at least one decorative member when not in use.

21. The apparatus of claim 20, wherein said at least one shelf means is slidably engaged in said storage cavity.

22. The apparatus of claim 2, wherein said at least one decorative member is eccentrically mounted relative to said at least one rotatable member for eccentric rotation thereof.

23. The apparatus of claim 2, wherein said at least one decorative member simulates a living being.

* * * * *